No. 761,946.

Patented June 7, 1904.

UNITED STATES PATENT OFFICE.

LLOYD CONNER, OF CARO, MICHIGAN.

COMPOSITION FOR BLACKBOARDS.

SPECIFICATION forming part of Letters Patent No. 761,946, dated June 7, 1904.

Application filed September 3, 1903. Serial No. 171,797. (No specimens.)

*To all whom it may concern:*

Be it known that I, LLOYD CONNER, a citizen of the United States, residing at Caro, in the county of Tuscola and State of Michigan, have invented certain new and useful Improvements in Composition for Blackboards; and I do hereby declare the following to be a full, clear, and exact description of the invention, such as will enable others skilled in the art to which it appertains to make and use the same.

This invention is a composition of matter especially adapted for use in making blackboards and similar articles requiring certain physical characteristics of surface; and the objects of the invention are to provide a mixture having the property of producing a smooth marking-surface having sufficient grit or roughness to take marking-chalk to such an extent that a clean clear mark is made on the blackboard, but yet of such smoothness that it does not take up surplus chalk, and consequently erases easier with less dust than blackboards made in the manner heretofore common.

Further objects of the invention are to produce a blackboard that will have great durability, be practically impervious to moisture and not liable to deteriorate through changes of temperature, and that will be stronger and withstand harder usage than ordinary blackboards.

To obtain the above desirable results, I have produced the following composition of matter, which has in practice been found to exactly meet the requirements. I take of calcined plaster, which is pure stone in powder form, twenty (20) parts, of Portland cement ten (10) parts, and one (1) part of pulverized emery. These three ingredients are thoroughly mixed, and to them is added the required amount of coloring-matter, which usually consists in about five (5) parts of chrome-green powder for a green board, or the same quantity of lampblack if a black board is desired; but the quantity of coloring-matter can be varied to suit individual taste. The coloring-matter is first cut with wood-alcohol to form a liquid of the consistency of cream and is then mixed with the plaster, cement, and emery, together with sufficient water to make the whole a paste of proper consistency to spread easily with a trowel—in other words, of about the consistency of what is commonly known as "hard finish" for plaster walls.

If atmospheric conditions are such as to make the mixture set too rapidly while being applied to the wall, its setting may be checked by adding what is commonly known as "glue sizing," consisting in glue dissolved in cold water.

The glue sizing may be dispensed with when the composition does not tend to set too rapidly.

The composition is applied to the wall in the same way as ordinary hard finish to a plastered wall. As it commences to set or harden it must be thoroughly troweled until its surface is hard and smooth, moistening with a wet brush while troweling.

The plaster, cement, and emery ingredients are all abrasives and are all of very fine texture, so that when thoroughly troweled and hardened they produce a surface that is to all appearances perfectly smooth, yet having sufficient grit or abrasive properties to take from the marking-chalk a very thin yet clear and distinct and uniform layer, producing a sharp clear line. This marking-surface requires less chalk for a given amount of marking than surfaces commonly found in blackboards. The texture of the finished surface is almost that of rock and takes clear legible marks from either common chalk, the so-called "dustless" chalk, soapstone, or slate-pencil. The marks are made with such a small amount of chalk that a large area of written surface can be erased with a dry cloth or eraser without producing noticeable dust. The absence of chalk-dust is of great importance in the sanitary requirements of modern school-buildings.

While I have specified ten parts of Portland cement as being best adapted to twenty parts of calcined plaster, yet the quantity of cement may be varied within reasonable limits to suit local requirements. An increase in the quanity of cement increases the hardness and durability of the blackboard and also tends to make it more perfectly moisture-proof, so that in buildings exposed to moisture or to vapor from leaky steam-pipes it is desirable to slightly increase the proportion of cement.

I have found in practice that the active abrasive of the mixture, the pulverized emery, may be substituted by pulverized sandstone, if desired. The results with the sandstone will not be quite as satisfactory as when emery is used; but in localities where it is difficult to procure emery two parts of pulverized sandstone may be used.

By the means above described I have produced a composition of matter from which blackboards of the highest grade can be made with very little expense additional to that required for a blackboard made of the common mixture of lime, putty, and plaster.

What I claim as my invention, and desire to secure by Letters Patent, is—

1. The herein-described composition of matter, consisting of calcined lime, Portland cement, abrasive powder, pigment and water, for the purposes set forth and combined substantially as specified.

2. The herein-described composition of matter, consisting of calcined lime, Portland cement, emery-powder and water, for the purposes set forth and substantially as specified.

In testimony whereof I affix my signature in presence of two witnesses.

LLOYD CONNER.

Witnesses:
 AMOS L. KINNEY,
 MABEL A. CONNER.